(12) United States Patent
Aoki

(10) Patent No.: US 7,250,597 B2
(45) Date of Patent: Jul. 31, 2007

(54) MEASURING AND ADJUSTMENT DEVICE FOR AN ALIGNMENT OPTICAL SYSTEM AND ADJUSTMENT METHOD THEREOF

(75) Inventor: Hiroshi Aoki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/326,434

(22) Filed: Jan. 6, 2006

(65) Prior Publication Data

US 2006/0151679 A1 Jul. 13, 2006

(30) Foreign Application Priority Data

Jan. 11, 2005 (JP) .............................. 2005-004499

(51) Int. Cl.
*G02B 6/26* (2006.01)
*G01J 1/10* (2006.01)
(52) U.S. Cl. ............................. 250/227.24; 250/201.1; 250/227.11; 250/227.2; 250/234; 362/285; 385/15; 385/52; 385/901
(58) Field of Classification Search ................ 250/205, 250/201.1, 206.1, 227.2, 227.24, 228.28, 250/227.29, 559.07, 559.08, 559.3, 234; 385/15, 16, 31, 33, 34, 38, 88, 901; 362/551, 362/553, 581, 582, 285–289
See application file for complete search history.

(56) References Cited

U.S. PATENT DOCUMENTS 5,797,674 A * 8/1998 Nagayama .................. 362/268

6,663,560 B2 * 12/2003 MacAulay et al. ......... 600/160
2004/0130777 A1 * 7/2004 Islam ......................... 359/334

FOREIGN PATENT DOCUMENTS

JP A 2001-317913 11/2001

* cited by examiner

*Primary Examiner*—Georgia Epps
*Assistant Examiner*—Davienne Monbleau
(74) *Attorney, Agent, or Firm*—Oliff & Berridge, PLC

(57) ABSTRACT

Avoiding an illumination light irregularity to the utmost under increasing degree of integration and the memory capacity by suppressing a light amount irregularity on the illumination pupil plane to the utmost, unable to be adjusted by a conventional method. When the light amount irregularity on the illumination pupil plane which is the exit surface of the optical fiber is relatively large, focus of the imaging surface of the CCD camera is switched from the sample to the illumination pupil plane by a focus switching lens. The light amount irregularity is calculated and analyzed by the image processor. Based on the analyzed result, the exit surface position of the optical fiber is adjusted in the illumination optical system. In this manner, the illumination pupil plane which is the exit surface of the optical fiber can be adjusted to an illumination pupil plane where the light amount irregularity is small.

2 Claims, 4 Drawing Sheets

FIG. 2C
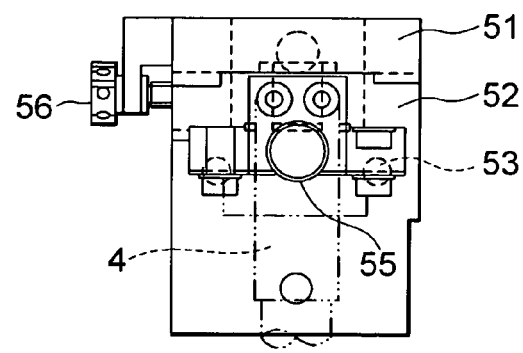
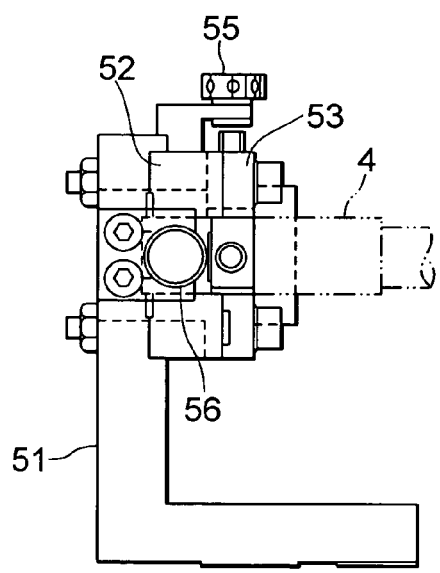
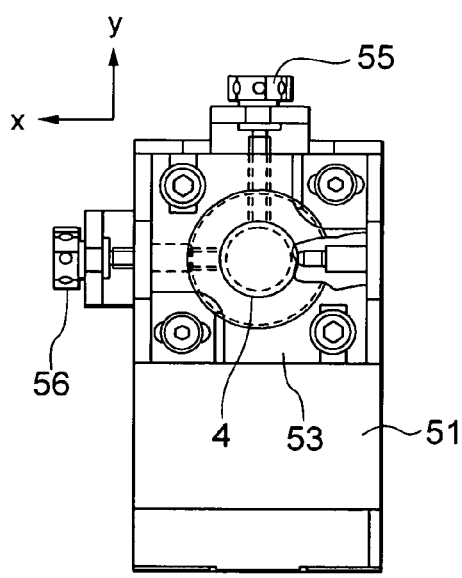
FIG. 2B       FIG. 2A

MEASURING AND ADJUSTMENT DEVICE FOR AN ALIGNMENT OPTICAL SYSTEM AND ADJUSTMENT METHOD THEREOF

The disclosure of the following priority application is herein incorporated by reference:

Japanese Patent Application No. 2005-004499 filed on Jan. 11, 2005.

BACKGROUND OF THE INVENTION

1. Field of the Invention

The present invention relates to a measuring device used for an alignment optical system and a position measurement optical system for various patterns formed on a wafer and an adjustment method thereof.

2. Related Background Art

As disclosed in Japanese Patent Application Laid-Open No. 2001-317913, a position measurement optical system for various patterns formed on a wafer is conventionally composed of an illumination optical system, an imaging optical system and an image processing means as shown in FIG. 4. Incidentally, FIG. 4, which is a prior art, is a schematic view of a position measurement optical system for various patterns.

In the illumination optical system, a filament image of a light source 1 such as a halogen lamp is projected on an incident plane of an optical fiber 4 by a first and a second light source relay lenses 2 and 3. The illumination light is projected on an illumination aperture stop 7 by a first and a second illumination relay lenses 5 and 6 through the optical fiber 4.

Then, the illumination light passes through a third illumination relay lens 8, a field stop 9, and a fourth illumination relay lens 10, and is reflected by an epi-illumination prism 11 by an amount of 90 degrees to illuminate a wafer 14 through an imaging aperture stop 12 and a first objective lens 13. The wafer 14 on which a pattern to be measured is formed is placed on a wafer holder 15 that is disposed on a moving stage 16.

In the imaging optical system, the light reflected from the pattern to be measured formed on the wafer 14 passes again through the first objective lens 13, and forms an image on an imaging surface of a CCD camera 18 after passing through the imaging aperture stop 12, the epi-illumination prism 11, and a second objective lens 17.

In the image processing means, after the image of the pattern to be measured projected on the imaging surface of the CCD camera 18 is converted into a digital signal, the image is sent to an image processor 19 so that the position measurement with respect to the pattern to be measured is carried out.

Incidentally, in a measuring device using the above-described optical microscope, optical errors such as a telecentric error of an illumination optical system, that of an imaging optical system, and coma significantly effect measurement accuracy. Accordingly, various measures to improve accuracy have been devised.

For example, there is a method to use an adjustment pattern having a difference of an eighth of the illumination wavelength, which is sensitive to detect an error in the optical system. By using the reference pattern, the error in the optical system can be presumed from variation in symmetry of the optical image with respect to an offset amount of focusing, so that an adjustment mechanism portions such as the illumination aperture stop 7, the imaging aperture stop 12, and the second objective lens 17 can be adjusted to the optimum position.

However, an illumination light irregularity of the illumination optical system has not been regarded as a problem since the effect thereof to the accuracy is small.

In order to reduce the illumination light irregularity, a sufficient effect has been obtained by inserting an optical diffuser such as a lemon skin filter into the illumination optical system.

As shown in FIG. 4, a lemon skin filter 20 as an optical diffuser is disposed between the exit surface of the optical fiber 4 and the first illumination relay lens 6.

However, with increasing degree of integration of a semiconductor device and the amount of memory, accuracy to be required to a measuring device is getting dramatically severe, so that the illumination light irregularity is no longer able to be ignored.

Although the optical diffuser such as a lemon skin filter is inserted in the vicinity of the exit surface of the optical fiber, it is impossible to completely remove the light amount irregularity on the exit surface of the optical fiber.

Generally, an optical fiber bundle is constructed such that a plurality of fibers, each composed of core and cladding, are twisted each other. Since there are small gaps between fibers, the gaps become a cause of the light amount irregularity. Moreover, it is unavoidable that there includes a several percentage of snapped fibers upon fabrication. Furthermore, the light amount irregularity and the position of the filament image of the halogen lamp projected on the incident surface of the optical fiber can also be a cause of the light amount irregularity on the exit surface of the optical fiber.

The diameter of the core on the exit surface of the optical fiber is sufficiently large with respect to the diameter of the illumination pupil plane, so that it has been constructed such that strict positional alignment is not necessary. Therefore, an adjustment mechanism has not been attached to the device so far.

However, as increasing degree of integration of a semiconductor device as well as the memory capacity, there is a serious possibility that the measuring device causes a large illumination light irregularity caused by a light amount irregularity on the exit surface of the optical fiber.

SUMMARY OF THE INVENTION

The present invention is made in view of the aforementioned problems and has an object to provide a measuring device with high accuracy avoiding the illumination light irregularity as much as possible under increasing degree of integration of a semiconductor device as well as the memory capacity by suppressing the light amount irregularity on the illumination pupil plane as much as possible, which is impossible to be adjusted by a conventional method, and an adjustment method thereof.

According to one aspect of the present invention, there is provided a measuring device including a light source that provides illumination light to a sample, an illumination optical system that leads the illumination light at least through an optical fiber, an imaging optical system that is used for observing an image of the sample, and an image processor that inputs an optical image by an imaging means and carries out image processing. The measuring device includes a focus switching means that switches a conjugate relationship of an imaging surface of the imaging means with the sample to a conjugate relationship of an imaging surface of the imaging means with an illumination pupil plane which is an exit surface of the optical fiber, an analyzing means that calculates a light amount irregularity of the illumination pupil plane which is the exit surface of the optical fiber by the image processor, and an optical fiber exit surface position adjusting mechanism that adjusts a position of the exit surface of the optical fiber in the illumination optical system on the basis of an analyzed result of the analyzing means.

According to another aspect of the present invention, there is provided a method of adjusting a measuring device that includes a light source that provides illumination light to a sample, an illumination optical system that leads the illumination light at least through an optical fiber, an imaging optical system that is used for observing an image of the sample, and an image processor that inputs an optical image by an imaging means and carries out image processing. The method includes switching step that switches a conjugate relationship of an imaging surface of the imaging means with the sample to a conjugate relationship of an imaging surface of the imaging means with an illumination pupil plane which is an exit surface of the optical fiber, analyzing step that calculates a light amount irregularity of the illumination pupil plane which is the exit surface of the optical fiber by the image processor, and adjusting step that adjusts a position of the exit surface of the optical fiber in the illumination optical system on the basis of an analyzed result of the analyzing means.

According to the present invention, the measuring device is constructed such that focus of the imaging surface of the imaging means is switched from the sample to the illumination pupil plane which is the exit surface of the optical fiber, the light amount irregularity of the illumination pupil plane which is the exit surface of the optical fiber is calculated and analyzed by the image processor, and on the basis of the analyzed result the position of the exit surface of the optical fiber is adjusted in the illumination optical system.

Accordingly, the embodiment of the present invention makes it possible to provide a measuring device with high accuracy avoiding the illumination light irregularity as much as possible under increasing degree of integration of a semiconductor device as well as the memory capacity by suppressing the light amount irregularity on the illumination pupil plane as much as possible, which is impossible to be adjusted by a conventional method.

Other features and advantages according to the invention will be readily understood from the detailed description of the preferred embodiment in conjunction with the accompanying drawings.

BRIEF DESCRIPTION OF THE DRAWINGS

FIGS. 2A, 2B, and 2C are views showing an optical fiber exit surface position adjusting mechanism, in which FIG. 2A is a front view, FIG. 2B is a side view, and FIG. 2C is a plan view.

DESCRIPTION OF THE MOST PREFERRED EMBODIMENTS

A measuring device and an adjustment method of the device according to an embodiment of the present invention are explained below with reference to accompanying drawings.

Figure 1:
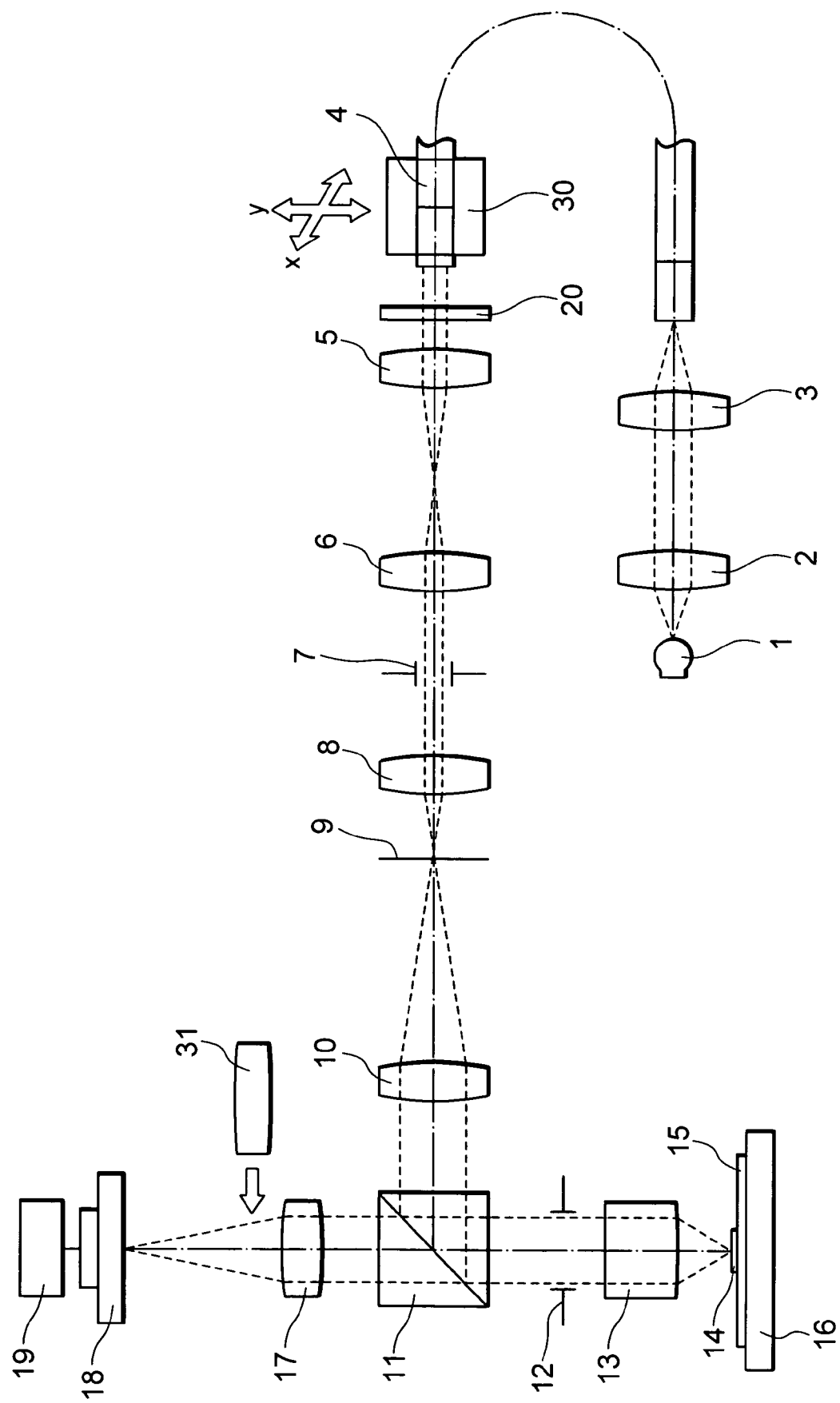
FIG. 1 is a schematic view of a position measurement optical system for various patterns according to an embodiment of the present invention.

FIG. 1 is a schematic view of a position measurement optical system for various patterns according to an embodiment of the present invention.

FIGS. 2A, 2B, and 2C are views showing an optical fiber exit surface position adjusting mechanism, in which FIG. 2A is a front view, FIG. 2B is a side view, and FIG. 2C is a plan view.

Figure 3A:
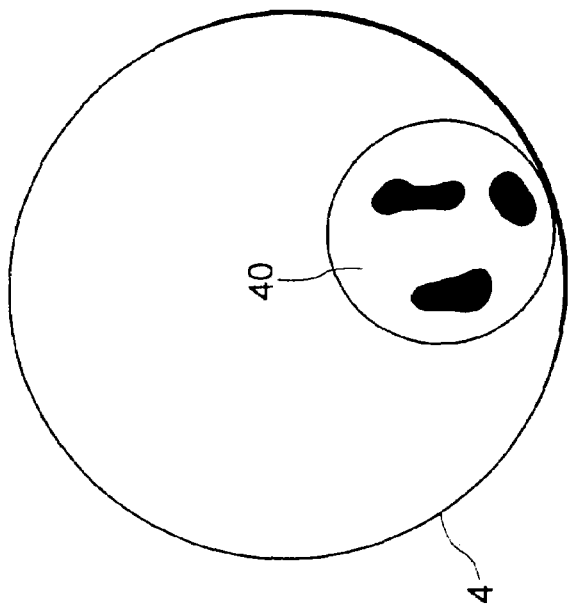
FIG. 3A is a view showing a pupil plane condition and an illumination condition before adjusting the position of the optical fiber.
Figure 3A:
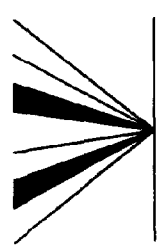
Figure 3B:
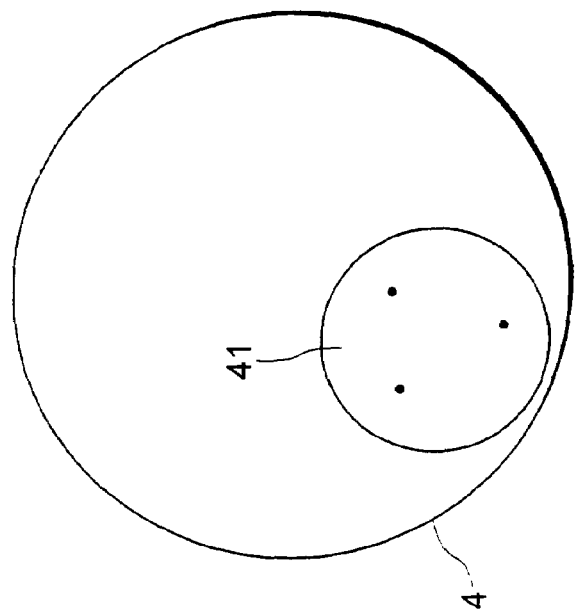
FIG. 3B is a view showing a pupil plane condition and an illumination condition after adjusting the position of the optical fiber.
Figure 3B:
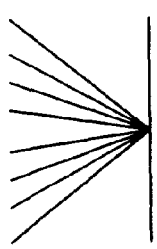
Figure 4:
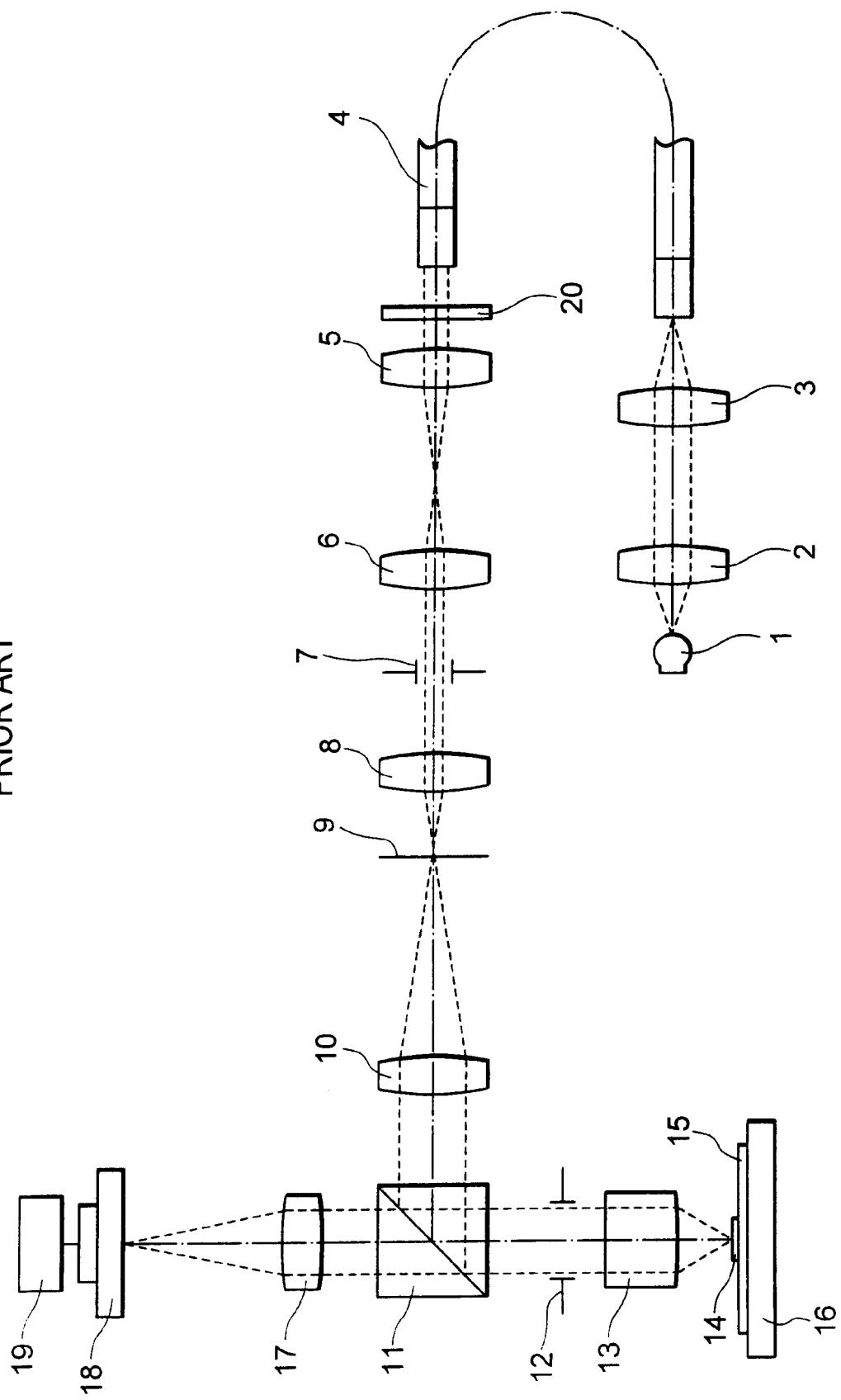
FIG. 4 is a schematic view of a position measurement optical system for various patterns according to a prior art.

FIG. 3A is a view showing a pupil plane condition and an illumination condition before adjusting the position of the optical fiber, and FIG. 3B is a view showing a pupil plane condition and an illumination condition after adjusting the position of the optical fiber.

As shown in FIG. 1, a position measurement optical system for various patterns formed, for example, on a wafer is composed of an illumination optical system, an imaging optical system, and an image processing means.

In the illumination optical system, a filament image of a light source 1 such as a halogen lamp is projected on an incident plane of an optical fiber 4 by a first and a second light source relay lenses 2 and 3. The illumination light is projected on an illumination aperture stop 7 by a first and a second illumination relay lenses 5 and 6 through the optical fiber 4. Incidentally, an optical diffuser 20 such as a lemon skin filter is disposed between the exit surface of the optical fiber 4 and the first illumination relay lens 5.

Then, the illumination light passes through a third illumination relay lens 8, a field stop 9, and a fourth illumination relay lens 10, and is reflected by an epi-illumination prism 11 by an amount of 90 degrees to illuminate a wafer 14 through an imaging aperture stop 12 and a first objective lens 13. The wafer 14 on which a pattern to be measured is formed is placed on a wafer holder 15 that is disposed on a moving stage 16.

In the imaging optical system, the light reflected from the pattern to be measured formed on the wafer 14 passes again through the first objective lens 13, and forms an image on an imaging surface of a CCD camera 18 after passing through the imaging aperture stop 12, the epi-illumination prism 11, and a second objective lens 17. The imaging surface of the CCD camera 18 is in the conjugate relation with the wafer 14.

In the image processing means, after the image of the pattern to be measured projected on the imaging surface of the CCD camera 18 is converted into a digital signal, the image is sent to an image processor 19 so that the position measurement with respect to the pattern to be measured is carried out.

In the embodiment of the present invention, an optical fiber exit surface position adjusting mechanism 30 for adjusting the position of the exit surface of the optical fiber 4 is disposed.

The imaging optical system is constructed such that a focus switching lens 31 is removably disposed between the second objective lens 17 and the CCD camera 18. For example, a slider member including the focus switching lens 31 may be inserted into the measuring device from outside. The focus switching lens 31, when disposed between the second objective lens 17 and the CCD camera 18, switches the focus of the imaging surface of the CCD camera 18 from the pattern to be measured on the wafer 14 to the exit surface of the optical fiber 4, which is the illumination pupil plane. In other words, the focus switching lens 31, when disposed between the second objective lens 17 and the CCD camera 18, switches the conjugate relationship of the imaging surface of the CCD camera 18 with the pattern to be measured on the wafer 14 to the conjugate relationship of the imaging surface of the CCD camera 18 with the exit surface of the optical fiber 4.

As shown in FIGS. 2A, 2B and 2C, the basic components of the optical fiber exit surface position adjusting mechanism 30 are a base member 51, a y-moving table 52 and an x-moving table 53.

In other words, it is constructed such that the optical fiber 4 can be held by the x-moving table 53, the y-moving table 52 can be moved in the y direction with respect to the base member 51, and the x-moving table 53 can be moved in the x direction with respect to the y-moving table 52. With this construction, the position of the exit surface of the optical fiber 4 can be adjusted two-dimensionally in x and y directions.

The x-moving table 53 can be adjusted in the x direction by turning an x-turning knob 56 and the y-moving table 52 can be adjusted in the y direction by turning a y-turning knob 55. After adjusting the position of the x and y moving tables 53 and 52, it is constructed such that the position of the x and y moving tables 53 and 52 is fixed by respective screws disposed in the vicinity of the x-turning knob 56 and the y-turning knob 55.

Then, in the imaging optical system, the focus switching lens 31 is inserted between the second objective lens 17 and the CCD camera 18 to switch the focus of the imaging surface of the CCD camera 18 from the pattern to be measured formed on the wafer 14 to the illumination pupil plane which is the exit surface of the optical fiber 4. In other words, the insertion of the focus switching lens 31 changes the conjugate relationship of the imaging surface of the CCD camera 18 with the pattern to be measured formed on the wafer 14 to the conjugate relationship of the imaging surface of the CCD camera 18 with the exit surface of the optical fiber 4.

Accordingly, the illumination pupil plane 40 is projected on the imaging surface of the CCD camera 18 as shown in FIG. 1. The image of the pupil plane is calculated and analyzed by the image processor 19.

When the light amount irregularity of the pupil plane on the exit surface of the optical fiber 4 is relatively large and there is brightness distribution in the illumination condition as shown in FIG. 3A, the measuring device is to include considerable illumination light irregularity caused by the light amount irregularity in the pupil plane.

Accordingly, in the embodiment of the present invention, the light amount irregularity in the illumination pupil plane which is the exit surface of the optical fiber 4 is to be adjusted.

When the illumination pupil plane is such a condition shown by 40 in FIG. 3A, by adjusting the position of the x-y moving tables 53 and 52 of the optical fiber exit surface position adjusting mechanism 30 shown in FIG. 2 on the basis of the analyzed result of the image processor 19, an illumination pupil plane 41 as shown in FIG. 3B, on which the light amount irregularity is small, is found out. Accordingly, the illumination pupil plane which is the exit surface of the optical fiber 4 is adjusted to an illumination pupil plane 41 where the light amount irregularity is small.

In particular, the image of the illumination pupil plane 40 formed on the imaging surface of the CCD camera 18 is calculated and analyzed by the image processor 19 to quantify the light amount irregularity. For example, the light amount irregularity on the illumination pupil plane is quantified and whether the light amount irregularity is within a tolerance range or not is judged.

In order to quantify the irregularity and judge the result, a given evaluation function or a flow chart may be used.

When the judgment is no good that means the light amount irregularity is large, the position of the exit surface of the optical fiber 4 is adjusted as shown by 40 and 41 in FIGS. 3A and 3B, respectively.

In this manner, the work for finding out an illumination pupil plane 41 as shown in FIG. 3B is repeated a plurality of times in consideration of the analyzed result of the image processor 19 to repeatedly adjust the position of the x-y moving tables 53 and 52.

When the judgment finally becomes acceptable, in other words, when the light amount irregularity becomes within an allowable range, the position of the x-y moving tables 53 and 52 is fixed. Accordingly, the illumination pupil plane which is the exit surface of the optical fiber 4 can be adjusted to the illumination pupil plane 41 on which the light amount irregularity is small.

As described above, in the embodiment of the present invention, when the light amount irregularity on the pupil plane condition of the exit surface of the optical fiber 4 is relatively large, the conjugate relationship of the imaging surface of the CCD camera 18 with the sample on the wafer 14 is switched from that of the imaging surface of the CCD camera 18 with the illumination pupil plane, which is the exit surface of the optical fiber 4, by the focus switching lens 31. The light amount irregularity of the illumination pupil plane which is the exit surface of the optical fiber 4 is calculated and analyzed by the image processor 19. On the basis of the analyzed result, the position of the exit surface of the optical fiber 4 is adjusted in the illumination optical system. In this manner, the illumination pupil plane which is the exit surface of the optical fiber 4 can be adjusted to an illumination pupil plane 41 where the light amount irregularity is small. By the way, when the light amount irregularity of the illumination pupil plane which is the exit surface of the optical fiber 4 cannot be adjusted within an allowable range, since the optical fiber 4 itself is considered to be defect, the optical fiber 4 may be replaced with a good one.

Accordingly, the embodiment of the present invention makes it possible to provide a measuring device with high accuracy avoiding the illumination light irregularity as much as possible under increasing degree of integration of a semiconductor device as well as the memory capacity by suppressing the light amount irregularity on the illumination pupil plane as much as possible, which is impossible to be adjusted by a conventional method.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A measuring device including a light source that provides illumination light to a sample, an illumination optical system that leads the illumination light at least through an optical fiber, an imaging optical system that is used for observing an image of the sample, and an image processor that inputs an optical image by an imaging means and carries out image processing, the measuring device comprising:

a focus switching means that switches a conjugate relationship of an imaging surface of the imaging means with the sample to a conjugate relationship of the imaging surface of the imaging means with an illumination pupil plane which is an exit surface of the optical fiber;

an analyzing means that calculates a light amount irregularity of the illumination pupil plane which is the exit surface of the optical fiber by the image processor; and an optical fiber exit surface position adjusting mechanism that adjusts a position of the exit surface of the optical fiber in the illumination optical system on the basis of an analyzed result of the analyzing means.

2. A method of adjusting a measuring device that includes a light source that provides illumination light to a sample, an illumination optical system that leads the illumination light at least through an optical fiber, an imaging optical system that is used for observing an image of the sample, and an image processor that inputs an optical image by an imaging means and carries out image processing, the method comprising:

switching step that switches a conjugate relationship of an imaging surface of the imaging means with the sample to a conjugate relationship of the imaging surface of the imaging means with an illumination pupil plane which is an exit surface of the optical fiber;

analyzing step that calculates a light amount irregularity of the illumination pupil plane which is the exit surface of the optical fiber by the image processor; and adjusting step that adjusts a position of the exit surface of the optical fiber in the illumination optical system on the basis of an analyzed result of the analyzing means.

* * * * *